US011602797B2

(12) United States Patent
Vogel

(10) Patent No.: US 11,602,797 B2
(45) Date of Patent: *Mar. 14, 2023

(54) WOOD CUTTING BAND SAW BLADE HAVING REDUCED KERF DUST

(71) Applicant: Wood-Mizer, LLC, Indianapolis, IN (US)

(72) Inventor: Chris Vogel, Greenwood, IN (US)

(73) Assignee: Wood-Mizer, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,638

(22) Filed: Apr. 21, 2020

(65) Prior Publication Data

US 2020/0246888 A1 Aug. 6, 2020

Related U.S. Application Data

(63) Continuation of application No. 14/842,625, filed on Sep. 1, 2015, now Pat. No. 10,625,353.

(51) Int. Cl.
*B23D 61/12* (2006.01)

(52) U.S. Cl.
CPC .......... *B23D 61/121* (2013.01); *Y10T 83/935* (2015.04); *Y10T 83/9317* (2015.04)

(58) Field of Classification Search
CPC ............. Y10T 83/9317; Y10T 83/9319; Y10T 83/935; Y10T 83/9353; Y10T 83/9355; B23D 61/12; B23D 61/121; B23D 65/00; B23D 65/02; B23D 65/04
USPC .................................. 83/661, 835, 848–850
See application file for complete search history.

(56) References Cited

U.S. PATENT DOCUMENTS

| 2,757,697 | A | 8/1956 | Simmons et al. |
| 2,826,941 | A | 3/1958 | Kolesh |
| 2,937,413 | A | 5/1960 | Hollingsworth |
| 4,179,967 | A | 12/1979 | Clark |
| 5,410,935 | A | 5/1995 | Holston |
| 6,119,571 | A | 9/2000 | Hayden |
| 6,276,248 | B1 | 8/2001 | Cranna |

(Continued)

FOREIGN PATENT DOCUMENTS

| EP | 1857211 A1 | 11/2007 |
| WO | 9520454 A1 | 8/1995 |

OTHER PUBLICATIONS

International Search Report, filed in the PCT/US2016/049732 application, dated Dec. 13, 2016.

*Primary Examiner* — Ghassem Alie
(74) *Attorney, Agent, or Firm* — Maginot, Moore & Beck LLP

(57) ABSTRACT

A wood cutting band saw blade includes a band having a continuous band portion and having on at least one lengthwise edge a plurality of teeth. The plurality of teeth extend upward from the continuous band portion, and the lengthwise edge extends in a horizontal direction. Each tooth includes a cutting edge and a back angle edge defining a tip. Each tooth also includes a gullet having a forward edge extending upward from a location at a lowest extent of the gullet to the back angle edge. The gullet further includes a rearward edge extending upward from a vertical level at the lowest extent of the gullet to a cutting edge of an adjacent tooth. The location at the lowest extent of the gullet is closer to the tip than to a tip of the adjacent tooth.

15 Claims, 5 Drawing Sheets

(56) References Cited

U.S. PATENT DOCUMENTS

| | | |
|---|---|---|
| 6,601,495 B2 | 8/2003 | Cranna |
| 6,834,573 B1 | 12/2004 | Nakahara |
| 7,036,415 B2 | 5/2006 | Tsujimoto |
| 8,113,100 B1 | 2/2012 | Cranna et al. |
| 8,621,972 B2 | 1/2014 | Nagano |
| 10,625,353 B2 * | 4/2020 | Vogel .................. B23D 61/121 |
| 2006/0065098 A1 | 3/2006 | Cranna |
| 2011/0154970 A1 | 6/2011 | Oshibe et al. |
| 2014/0260882 A1 | 9/2014 | Elliston et al. |

* cited by examiner

WOOD CUTTING BAND SAW BLADE HAVING REDUCED KERF DUST

CROSS-REFERENCE TO RELATED APPLICATIONS

This application is a continuation of U.S. patent application Ser. No. 14/842,625, filed Sep. 1, 2015, the contents of which are incorporated herein by reference.

FIELD OF THE INVENTION

The present invention relates to saw blades, and more specifically, to wood cutting band saw blades.

BACKGROUND

Wood cutting band saw blades are used in band saws such as those used in portable and fixed saw mills. A typical band saw blade is structured as a steel band having a plurality of cutting teeth defined along one edge of the steel band. FIG. 1 shows a fragmentary side plan view of a typical prior art blade. As shown in FIG. 1, each cutting tooth 10a, 10b, 10c of a prior art blade is defined by a rake face or cutting edge 12, a back edge 14, and a gullet 16. Referring to exemplary tooth 10b, the gullet 16b is a concave notch that extends from the back edge 14b to the rake face 12c of the following cutting tooth 10c.

The teeth of a band saw are often arranged in a pattern of three teeth having different "set" angles, or different pitches with respect to the center of the band edge. As shown in FIG. 2, which represents a fragmentary top plan view of a portion of the fragmentary blade of FIG. 1, a portion 18a of the first tooth 10a has zero set angle, a portion 18b of the second tooth 10b has a set angle in a first direction, and a portion 18c of the third tooth 10c as a set angle in the opposite direction. Each of the portions 18a, 18b and 18c includes the respective rake face 12a, 12b, and 12c and the respective back edge 14a, 14b, and 14c.

One problem known in timber or lumber operations is the removal of dust from the work piece. The band saw process often results in significant amounts of sawdust on the work piece. Sawdust left on a work piece can create issues when sawing frozen lumber, and can inhibit further processing of wood, such as the treatment of the wood for use in pallets and the like. For example, pallets and/or wood used for making pallets are often heat treated, which involves the application of chemicals. Excessive dust build-up on the lumber at the time of the application of the chemicals can be problematic because the sawdust acts as a sponge, and absorbs much of the chemical intended to treat the lumber. In addition, pallets used for food and medical industries have more stringent dust requirements.

Dust removal after sawing can be a costly and time consuming process. Accordingly, there is a need for a more cost-effective way to reduce the amount of sawdust carried out by band sawing operations.

SUMMARY

At least some embodiments of the present invention address the above stated need, as well as others, by employing tooth design that aids in the removal of dust from the work piece during the sawing process. Some embodiments accomplish this using a tooth with a deep gullet featuring a relatively steep edge near the tip.

A first embodiment is a wood cutting band saw blade that includes band and a plurality of teeth extending upward from a continuous band portion. Each tooth includes a cutting edge and a back angle edge defining a tip, and a gullet. The gullet includes a forward edge extending from the back angle edge to a lowest point of the gullet, and a rearward edge extending upward from the lowest point to a cutting edge of an adjacent tooth.

In some embodiments, the lowest point of the gullet is closer to the tip than to a tip of the adjacent tooth. In other embodiments, the rearward edge of the gullet is longer than the forward edge of the gullet. The design of the gullet and its edges in such embodiments assists in the removal of sawdust from the kerf in an advantageous manner.

The above-described features and advantages, as well as others, will become more readily apparent to those of ordinary skill in the art by reference to the following detailed descriptions and accompanying drawings.

DETAILED DESCRIPTION

Figure 3:
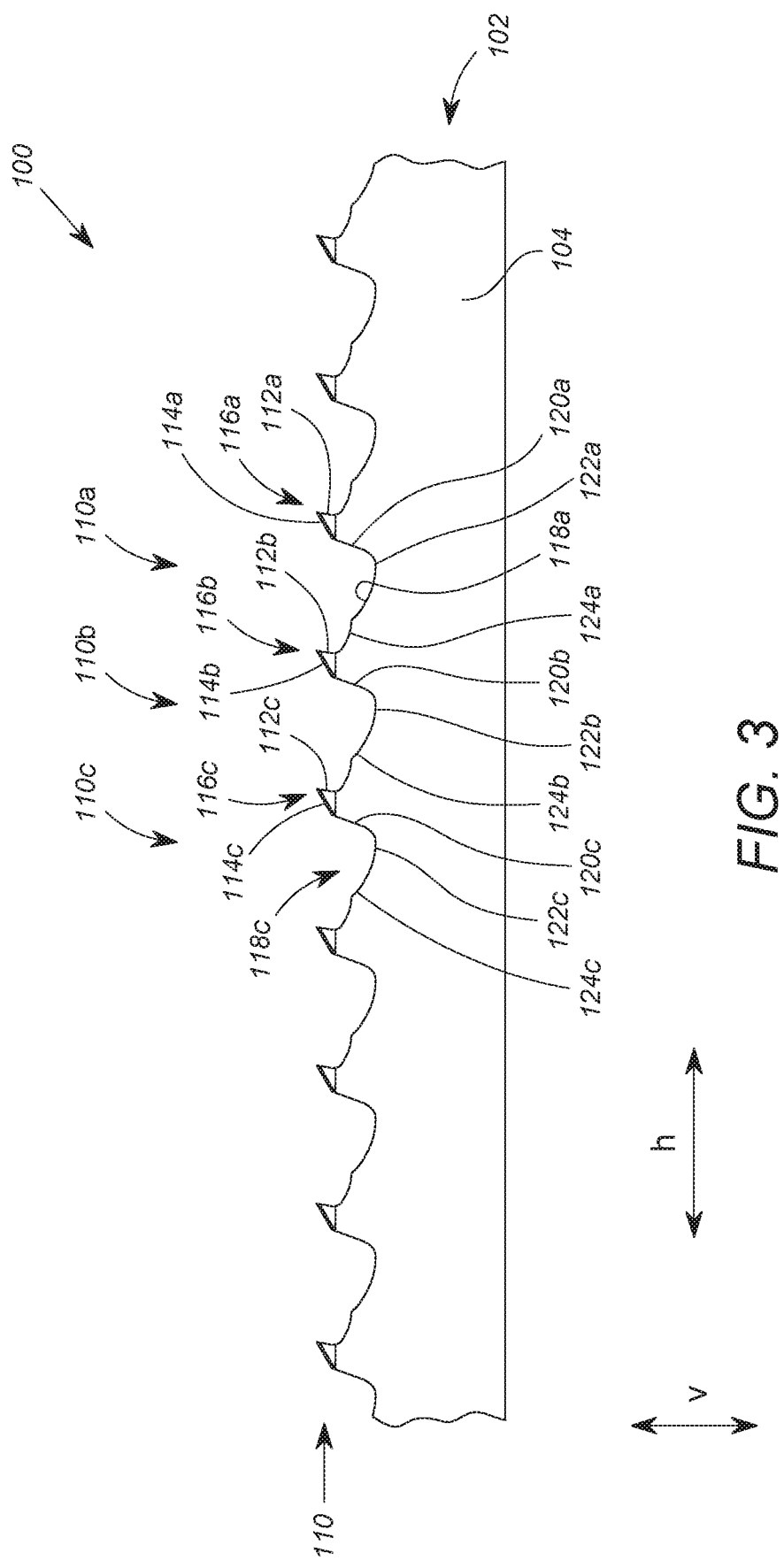
FIG. 3 shows a fragmentary side plan view of an exemplary band saw blade that incorporates a tooth design according to at least one embodiment of the invention.

FIG. 3 shows a fragmentary side plan view of a wood cutting band saw blade 100 that incorporates an exemplary wood cutting tooth design according to at least one embodiment of the invention. The band saw blade 100 comprises a band 102 having a continuous band portion 104 and on at least one length-wise edge a plurality of teeth 110, the plurality of teeth 110 extending upward from the continuous band portion 104. The band 102 is preferably constructed of a unitary piece of steel. Although not shown in FIG. 3, the band 102 extends around on itself to form a continuous loop, with the axis of the loop extending in the vertical direction v of FIG. 3. It will be noted that all directional references are based on the direction v being in the vertical direction, the direction h being in the lateral or horizontal direction, and the radial direction being orthogonal to the both directions h and v.

As shown in FIG. 3, the exemplary tooth 110a, includes a cutting edge 112a and a back angle edge 114a defining a tip 116a. The tooth 110a further includes a gullet 118a including a forward edge 120a extending from the back angle edge 114a to a lowest point 122a of the gullet 118a, and a rearward edge 124a extending upward from the lowest point 122a to a cutting edge 112b of an adjacent tooth 110b.

The adjacent tooth 110b similarly includes the cutting edge 112b and a back angle edge 114b defining a tip 116b. The tooth 110b includes a gullet 118b including a forward edge 120b extending from the back angle edge 114b to a lowest point 122b of the gullet 118b, and a rearward edge 124b extending upward from the lowest point 122b to the cutting edge 112c of an adjacent tooth 110c. The adjacent tooth 110c has a substantially similar design, including a cutting edge 112c, a back angle edge 114c, a tip 116c, and a gullet 118c including a forward edge 120c, a lowest point 122c and a rearward edge 124c.

Thus, from the side plan view perspective, the multiple teeth 110 have substantially similar designs. However, it will be appreciated that in some embodiments, a band saw blade having teeth having a design similar to that of the tooth 110a of FIG. 3 may be interleaved or interspersed with teeth having other designs. As will be discussed below in connection with FIG. 5, the plurality of teeth 110 may also differ in that they may have separate set angles.

Referring again to the tooth 110a by way of example, the tooth design of FIG. 3 is characterized by a steep drop off from the end of the back angle edge 114a to the lowest point 122a of the gullet 118a. This feature creates a mechanism for assisting in the removal of dust. For example, the void created by the steep forward edge 120a is believed to create a pressure differential which attracts loose dust therein, and further creates a moving space that transports the dust out of the kerf, not shown. In any event, blades of this design have been shown to significantly reduce dust on the work piece and/or kerf after use, as compared to the traditional blade shown in FIG. 1.

Figure 4:
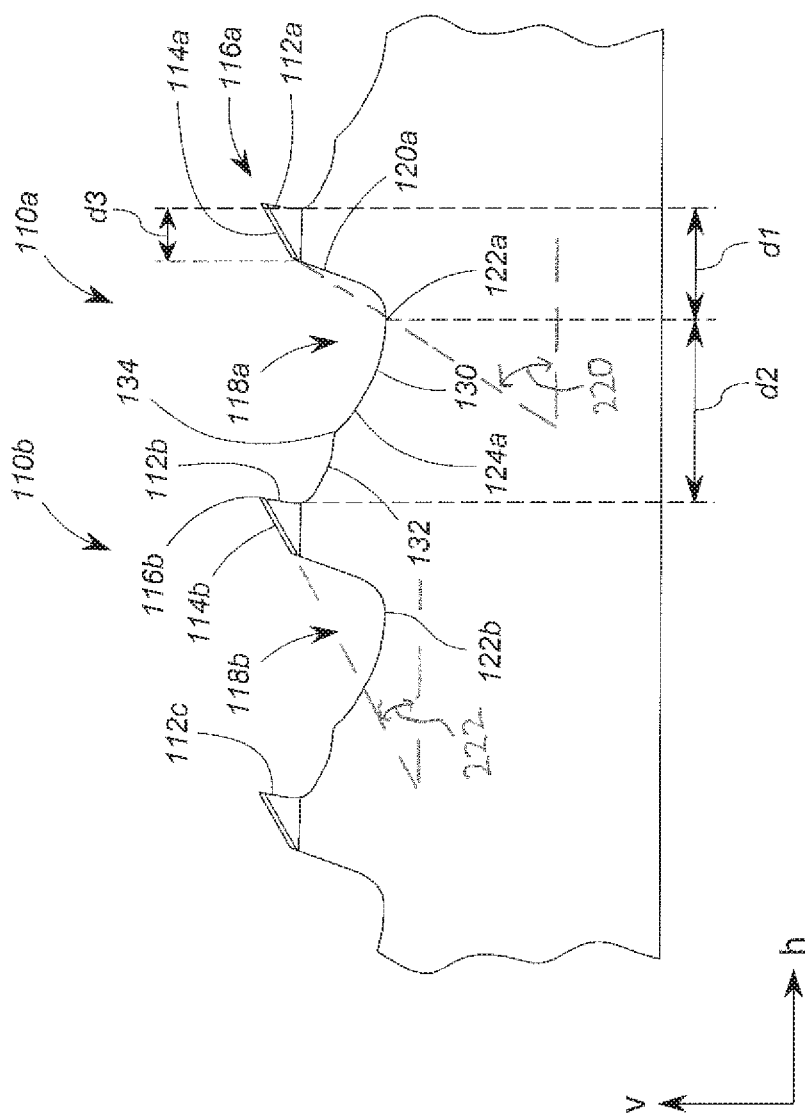
FIG. 4 shows an enlarged fragmentary side plan view of the band saw blade of FIG. 3.

Referring specifically to FIG. 4, this feature can be characterized by the structural relationship that the lowest point 122a of the gullet 118a is closer to the tip 116a than to a tip 116b of the (closest) adjacent tooth 110b. In other words, the horizontal distance d1 between the lowest point 122a of the gullet 118a and the tip 116a is smaller than the horizontal distance d2 between the lowest point 122a and the tip 116b.

Figure 1:
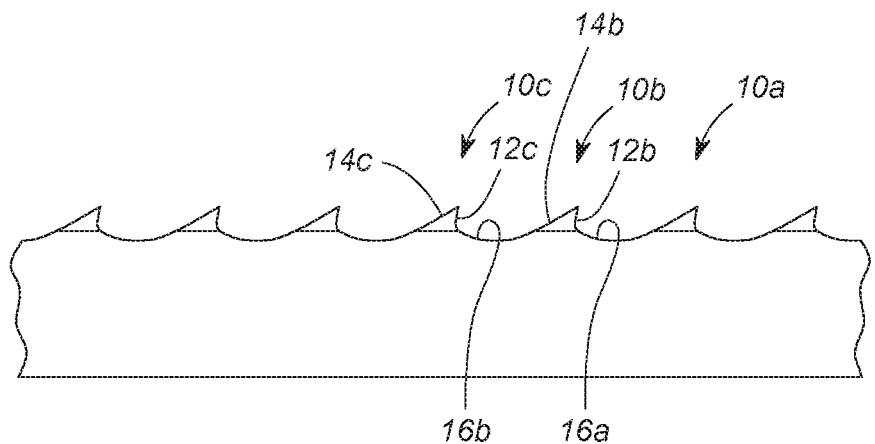
FIG. 1 shows a fragmentary side plan view of a band saw blade that incorporates a prior art design.

By contrast, in prior art designs, such as that shown in FIG. 1, the lowest point of the gullet 16b is closer to the tip of the adjacent tooth 10c than to the tip of the tooth 10b. Furthermore, because of the relatively steep angle of the forward edge 120a of the gullet 118a, the rearward edge 124a of the gullet 118a is at least twice as long as the forward edge 120a (in the horizontal direction), and generally longer in overall surface area (without regard to direction).

In this embodiment, the cutting edge 112a extends almost perpendicular from the horizontal direction, but slightly inclined to create an overhang of the tip 116a. In this embodiment, the cutting edge 112a extends at an angle approximately 80° from the horizontal direction h. The back edge 114a extends backward and downward from the tip at an angle of approximately 30° from the horizontal direction h. The forward edge 120a of the gullet 118a extends downward from the back edge at an angle of approximately 70° from the horizontal direction h. The horizontal distance d3 between the cutting edge 112a and the beginning of the forward edge 120a is approximate 20% of the distance (d1+d2) between the tips 116a and 116b.

It will be appreciated that the exact angles and distances of this example are not required to obtain the benefits of the invention, and that those of ordinary skill in the art may readily vary the particulars while retaining the general structure and operation. Preferably, however, the angle of the forward edge 120a should preferably be at least about 60° and/or at least twice that of the angle of the back edge 114a. Also, it will be appreciated that the back edge 114a and/or the forward edge 120a of the gullet 118a may be curved, and therefore of varying angle. Accordingly, it will be appreciated that the average angle 220 of the forward edge 120a should preferably be at least about twice the average angle 222 of the back edge 114a (shown for back edge 114b in FIG. 4), and/or at least 60°.

To provide additional structural strength, the gullet 118a in the present embodiment has two portions 130, 132 divided by a bump 134 in the rearward edge 124a. The portion 130 extends from the lowest point 122a to the bump 134, and the portion 132 extends from the bump 134 to the cutting edge 112b of the adjacent tooth 110b. The average slope (or angle of inclination from horizontal) of the portion 130 is greater than the average slope (angle of inclination from the horizontal) of the portion 132. Whether or not the rearward edge 124a includes the bump 134, the overall average slope of the rearward edge 124a is less than that of the forward edge 120a, and preferably less than half of the average slope of the forward edge 124a. In the embodiment described herein, each of the first portion 130 and the second portion 132 is concave and curved.

Figure 2:
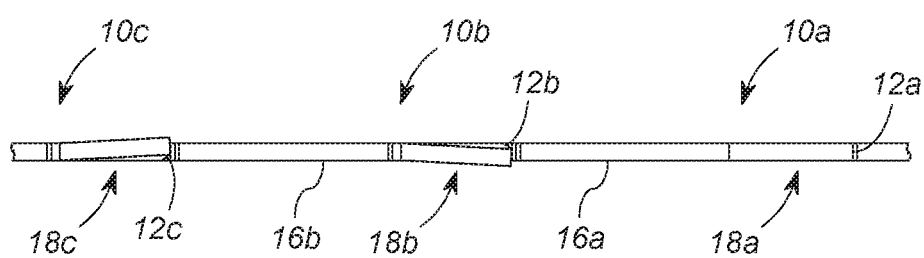
FIG. 2 shows a fragmentary top plan view of the band saw blade of FIG. 1 that incorporates the prior art design.
Figure 5:
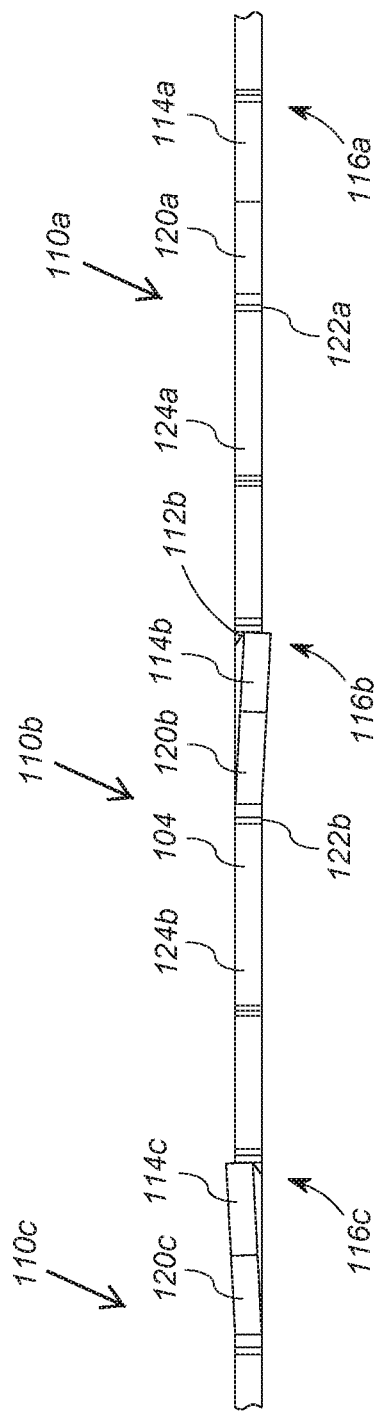
FIG. 5 shows a fragmentary top plan view of the band saw blade of FIG. 3.

Referring to FIG. 5, and as discussed further above, the teeth 110 are preferably arranged in three-tooth set patterns similar to that shown in FIG. 2. As shown in FIG. 5, the first tooth 110a is at a neutral or intermediate radial position. The tooth 110a essentially aligns radially with the body portion 104. By contrast, the second tooth 110b is set slightly radially outward. More specifically, the tip 116b, and at least portions of the cutting edge 112b and back edge 114b are slightly offset in the radially outward direction. The third tooth 110c, however, is set radially inward. More specifically, the tip 116c, and at least portions of the cutting edge 112c and back edge 114c are slightly offset in the radially inward direction.

The three-tooth pattern has been found to be effective in wood cutting, particularly in combination with the geometrical features of the gullets described herein. Nevertheless, it will be appreciated that embodiments of the invention are not limited to the three-tooth pattern illustrated in FIG. 5. In addition, it will be appreciated that the embodiments of the invention may readily be implemented on wood cutting band saw blades of multiple sizes.

Figure 6:
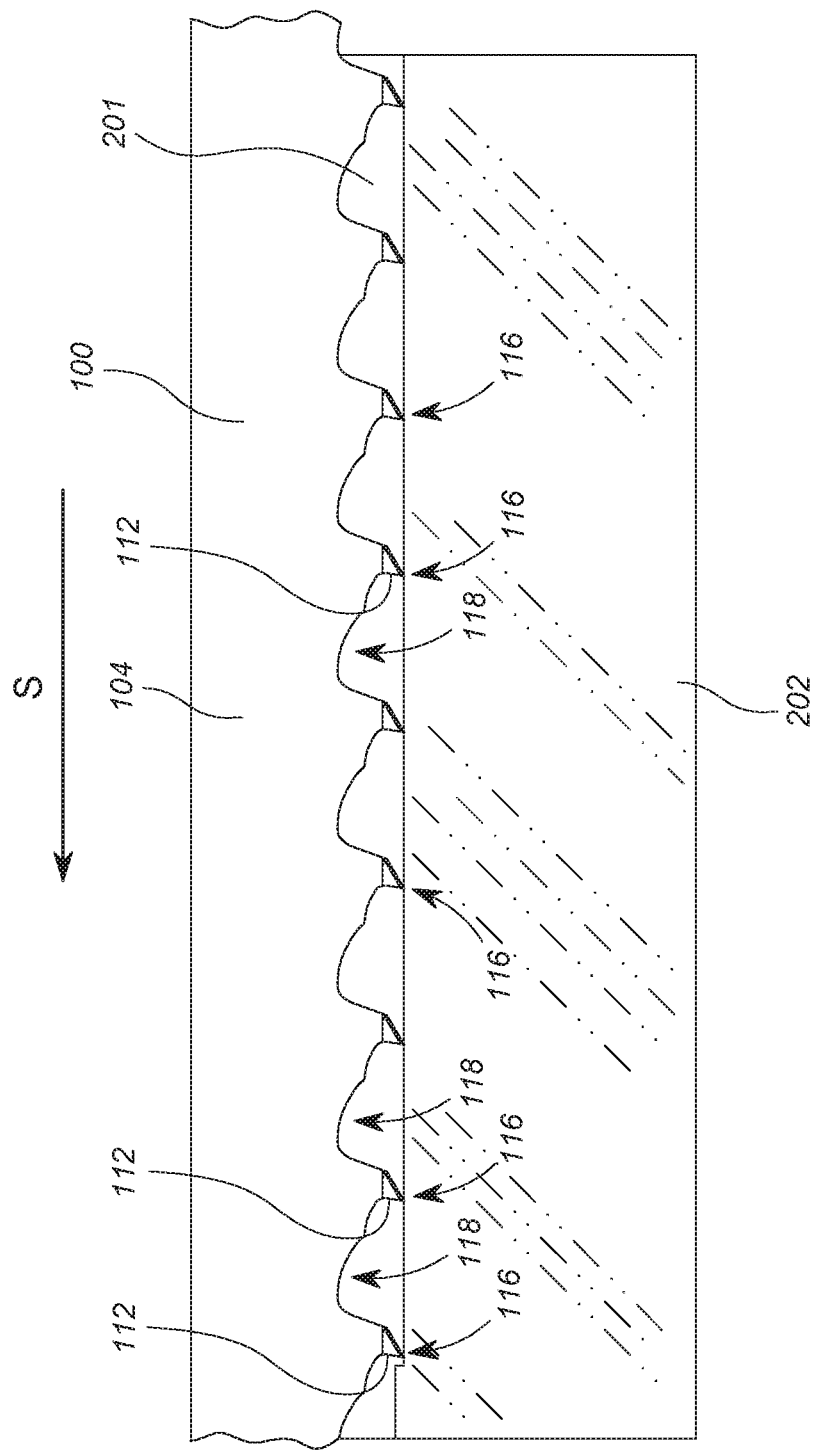
FIG. 6 shows a fragmentary cutaway view of the band saw blade of FIG. 3 within a kerf of a wood work piece.

In operation, the blade 100 is preferably affixed to a source of guided motive force, such as drive and tension wheels of a saw mill head, not shown. The operation of the band saw blade 100 to remove sawdust is described in connection to FIG. 6. FIG. 6 shows a fragmentary cutaway side view of the band saw blade 100 of FIG. 3 within a kerf 201 of a wood work piece 202. The wood work piece 202 is shown cutaway to reveal the interaction of the blade 100 and the work piece 202 within the kerf 201.

The motive force drives the blade 100 in the direction s shown in FIG. 6 through the cut area or kerf 201 of the wood work piece 202. The blade 100 is controlled such that the tips 116 and cutting edges 112 engage and cut the wood work piece 202 within the formed kerf 201. As the blade 100 is moved horizontally over the work piece 202 in the direction s, sawdust from the cutting action is drawn into and carried within the void created by the gullets 118. The dust is carried out past the end of the kerf 201 and away from the work piece 202. As a consequence, the volume of dust left within the kerf 201 or otherwise left on the work piece 202 is substantially reduced.

It will be appreciated that the above-describe embodiments are merely exemplary, and that those of ordinary skill in the art may readily devise their own implementations and adaptations that incorporate the principles of the present invention and fall within the spirit and scope thereof.

The invention claimed is:

1. A wood cutting band saw blade, comprising:
a band having a continuous band portion and having on at least one length-wise edge a plurality of teeth, the plurality of teeth extending upward from the continuous band portion, the at least one length-wise edge extending in a horizontal direction along a horizontal axis;
each tooth of the plurality of teeth including a cutting edge and a back angle edge defining a tip, and each tooth including a gullet, the gullet having a forward edge extending upward from a location at a lowest extent of the gullet to the back angle edge, the gullet further comprising a rearward edge extending upward from lowest extent of the gullet to a cutting edge of an adjacent tooth;
wherein the location at the lowest extent of the gullet is closer to the tip than to a tip of the adjacent tooth; and
wherein the cutting edge has a steeper average angle from the horizontal axis than an average angle of the back angle edge from the horizontal axis.

2. The wood cutting band saw blade of claim 1, wherein:
the average angle of the back angle edge defines an average first angle from the horizontal axis;
the forward edge of the gullet defines an average second angle from the horizontal axis; and
the average second angle is at least approximately twice the average first angle.

3. The wood cutting band saw blade of claim 2, wherein the average second angle is greater than 60° from the horizontal axis.

4. The wood cutting band saw blade of claim 1, wherein the rearward edge of the gullet defines an average first angle from the horizontal axis;
the forward edge of the gullet defines an average second angle from the horizontal axis; and
the average first angle is less than one-half of the average second angle.

5. The wood cutting band saw blade of claim 1, wherein a horizontal distance (d1) between the location at the lowest extent of the gullet and the tip is smaller than a horizontal distance (d2) between the location at the lowest extent of the gullet and the tip of the adjacent tooth.

6. The wood cutting band saw blade of claim 1, wherein each tooth is part of a three-tooth pattern having a first tooth set in a first direction, a second tooth set in a second direction, and a third tooth.

7. A wood cutting band saw blade, comprising:
a band having a continuous band portion and having on at least one length-wise edge a plurality of teeth, the plurality of teeth extending upward from the continuous band portion, the at least one length-wise edge extending in a horizontal direction;
each tooth of the plurality of teeth including a cutting edge and a back angle edge defining a tip, and each tooth including a gullet having a forward edge and a rearward edge, the forward edge extending from the back angle edge to a location at a lowest extent of the gullet, and the rearward edge extending monotonically upward from the lowest extent of the gullet to a cutting edge of an adjacent tooth;
wherein the rearward edge of the gullet is longer than the forward edge of the gullet; and
wherein an average angle of the back angle edge from the horizontal axis is less than an average angle of the forward edge from the horizontal axis.

8. The wood cutting band saw blade of claim 7, wherein a horizontal distance (d1) between the location at the lowest point of the gullet and the tip is smaller than a horizontal distance (d2) between the location at the lowest point of the gullet and a tip of the adjacent tooth.

9. The wood cutting band saw blade of claim 8, wherein:
the average angle of the back angle edge defines an average first angle from the horizontal axis;
the forward edge of the gullet defines an average second angle from the horizontal axis; and
the average second angle is at least approximately twice the average first angle.

10. The wood cutting saw blade of claim 9, wherein the average second angle is greater than 60° from the horizontal axis.

11. The wood cutting band saw blade of claim 7, wherein:
the average angle of the back angle edge defines an average first angle from the horizontal axis;
the forward edge of the gullet defines an average second angle from the horizontal axis; and
the average second angle is at least approximately twice the average first angle.

12. The wood cutting saw blade of claim 11, wherein the rearward edge of the gullet defines an average third angle from the horizontal axis that is less than one-half of the average second angle.

13. The wood cutting saw blade of claim 7, wherein each tooth is part of a three-tooth pattern having a first tooth set in a first direction, a second tooth set in a second direction, and a third tooth.

14. The wood cutting saw blade of claim 7, wherein the band is constructed of steel.

15. The wood cutting band saw blade of claim 7, wherein the cutting edge of the adjacent tooth extends upward at an average angle from the horizontal axis that is steeper than the average angle of the back angle edge from the horizontal axis.

* * * * *